O. T. EARLE.
CLAMPS FOR HOSE-COUPLINGS.
No. 172,982. Patented Feb. 1, 1876.
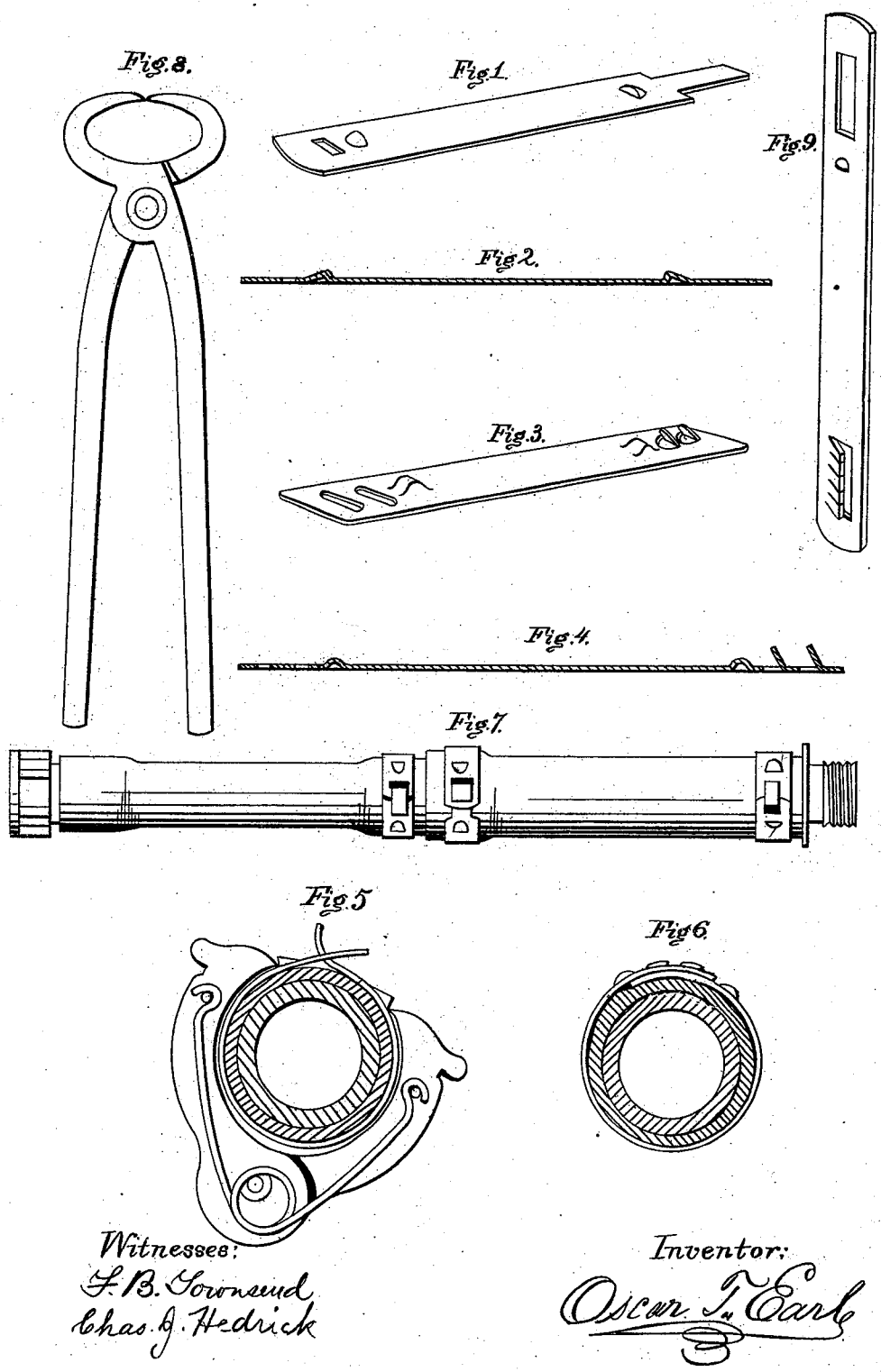

UNITED STATES PATENT OFFICE.

OSCAR T. EARLE, OF NORWALK, CONNECTICUT.

IMPROVEMENT IN CLAMPS FOR HOSE-COUPLINGS.

Specification forming part of Letters Patent No. 172,982, dated February 1, 1876; application filed September 11, 1875.

*To all whom it may concern:*

Be it known that I, OSCAR T. EARLE, of Norwalk, in the county of Fairfield and State of Connecticut, have invented certain new and useful Improvements in Clamps for Hose-Couplings; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to hose-coupling clamps or fastenings, not of the common kind known as hose-couplings, but to a new and useful device whereby hose may be coupled to the couplings proper, and also breakages may be repaired and extensions made in an easy, simple, and durable manner with an ordinary blacksmith's pinchers or pipe-tongs, or pliers, commonly used by gas-fitters; and it consists in punching or stamping out of sheet metal in one piece a strip of sufficient length to encompass any of the various size hose in common use; and also consists in forming a tongue or projection at one end of said strip, which will be inserted in corresponding apertures formed in the other or opposite end of the same, by which the two ends are interlocked or interlaced with each other, so as to obtain great lateral strength and rigidity, and power of resistance, and, by means of suitable clamps formed of jaws and springs, they may be united and held firmly in position, which will be hereinafter more fully described.

It is well known that many attempts have been made in this direction, the devices being principally constructed of cast metal, and some have been forged out of wrought-iron, but, as far as I am aware, none have been successful. The efforts heretofore made have failed principally for lack of flexibility and capacity in the devices to fit the varying thickness of the hose of the different makers.

It may be said, and proved by actual experience, that these clamps will hold or fasten firmly together, on the same thimble or coupling, hose varying in thickness from one to four ply, using the one-size clamp.

Referring to the drawings, Figure 1 represents a perspective view of a single band or strip provided with one aperture and a corresponding tongue, and having projecting lugs or bosses for receiving the gripe of the pinchers, tongs, or vise, to force the strip to a proper position around the hose. Fig. 2 is a longitudinal section through the center of same. Fig. 3 is a perspective view of a strip before bending into place, showing perforations, lugs, and corresponding projections for use on regular and uniform sized hose, and which may be made with two or more projections or fastenings, as may be desired. Fig. 4 is a longitudinal section of Fig. 3. Fig. 5 represents a cross-section of the fastening before being clinched into position; also, a cross-section of hose and hose-coupling, with the jaws or clamps I prefer to use for securing the fastenings, the spring serving to open or withdraw the clamp when the joint is finished. Either the tongs or pinchers before alluded to may be used instead. Fig. 6 represents an edge view of Figs. 3 and 4, with a cross-section of hose and hose-coupling with the fastenings clinched down complete for use. Fig. 7 shows a plan of hose pipes, couplings, and fastenings, all completely coupled ready for use, one end of said hose representing a small section, while the other represents a larger one; and it will be seen that at the middle of the hose the thimble used to join them together with is the same diameter its entire length, while the same size fastening or clamp is used for both ends, thus showing that these fastenings are capable of taking up hose of variable sizes and in this manner.

The tongues of the band are of such length that it is adjustable to any size within its range, and thus compensate for variation in the sizes of hose.

It will be observed that this method is simple and cheap, and easily manipulated by any person of ordinary capacity. It will also be observed in steam and air brakes, fire-hose, &c., that great danger is caused by the breakage, bursting, or fracturing of the hose or connections, and exceedingly great losses of both property and life often result from being unable to repair them in a short space of time.

Thus will be seen the importance of this invention, and in what way the dangers and losses above enumerated can be avoided.

The locking or interlacing device may be made in many different forms and modifications; but I do not confine myself to any particular form that may be stamped out of sheet metal in one piece, but claim a sheet-metal hose clamp or fastening stamped or punched by any well-known method or design, by which a sheet-metal strip or fastening is formed for hose-coupling.

Having thus fully described my invention, what I claim, and desire to secure by Letters Patent, is—

A strip or band forming a clamp or fastening for hose, stamped or punched out of sheet metal in one piece, having perforations and corresponding tongues or projections, substantially as set forth and described.

In testimony that I claim the foregoing as my own invention I affix my signature in the presence of two witnesses.

OSCAR T. EARLE.

Witnesses:
F. P. MULLOY,
C. H. MOULTON.